United States Patent
Hariu et al.

(10) Patent No.: US 9,316,135 B2
(45) Date of Patent: Apr. 19, 2016

(54) HEAT STORAGE DEVICE

(71) Applicant: KABUSHIKI KAISHA TOYOTA JIDOSHOKKI, Aichi (JP)

(72) Inventors: Satoshi Hariu, Aichi (JP); Takafumi Yamasaki, Aichi (JP); Hidehito Kubo, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/401,313

(22) PCT Filed: May 16, 2013

(86) PCT No.: PCT/JP2013/063690
§ 371 (c)(1),
(2) Date: Nov. 14, 2014

(87) PCT Pub. No.: WO2013/172422
PCT Pub. Date: Nov. 21, 2013

(65) Prior Publication Data
US 2015/0135688 A1    May 21, 2015

(30) Foreign Application Priority Data
May 18, 2012 (JP) .................... 2012-114286

(51) Int. Cl.
*F01N 3/10* (2006.01)
*F01N 3/20* (2006.01)
(Continued)

(52) U.S. Cl.
CPC .............. *F01N 3/2006* (2013.01); *C09K 5/16* (2013.01); *F01N 3/106* (2013.01); *F01N 3/24* (2013.01);
(Continued)

(58) Field of Classification Search
CPC ........... C09K 5/17; F01N 3/2006; F01N 3/24; F28F 3/02; F28D 20/003; F28D 1/0233
USPC .......................................................... 60/300
See application file for complete search history.

(56) References Cited

U.S. PATENT DOCUMENTS

| | | | | |
|---|---|---|---|---|
| 4,991,644 A | * | 2/1991 | Miaoulis | F01N 5/02 |
| | | | | 123/41.14 |
| 5,653,106 A | * | 8/1997 | Katashiba | F01N 3/20 |
| | | | | 123/142.5 R |

(Continued)

FOREIGN PATENT DOCUMENTS

| | | |
|---|---|---|
| CN | 101506483 | 8/2009 |
| JP | 4-347320 | 12/1992 |

(Continued)

OTHER PUBLICATIONS

Office Action issued in China Counterpart Patent Appl. No. 201380025979.1, dated Oct. 26, 2015.
Search report from PCT/JP2013/063690, mail date is Aug. 6, 2013.
International Preliminary Report on Patentability in PCT/JP2013/063690, mail date is Dec. 18, 2014.

*Primary Examiner* — Jason Shanske
(74) *Attorney, Agent, or Firm* — Greenblum & Bernstein, P.L.C.

(57) ABSTRACT

A heat storage device includes a reactor, arranged in an exhaust system, having a formed body chemically reacting with ammonia and generating heat, and an ammonia reservoir, connected to the reactor, for storing ammonia. The ammonia reservoir incorporates therein an absorbent physically absorbing ammonia. The ammonia reservoir has a heat-exchanging structure and is temperature controlled by heat exchange with an external heating medium.

5 Claims, 5 Drawing Sheets

(51) Int. Cl.
*C09K 5/16* (2006.01)
*F28F 3/02* (2006.01)
*F28D 20/00* (2006.01)
*F28D 1/02* (2006.01)
*F01N 3/24* (2006.01)
*F28D 21/00* (2006.01)

(52) U.S. Cl.
CPC .............. *F28D 1/0233* (2013.01); *F28D 20/00* (2013.01); *F28D 20/003* (2013.01); *F28F 3/02* (2013.01); *F01N 2240/02* (2013.01); *F01N 2260/08* (2013.01); *F01N 2550/14* (2013.01); *F01N 2570/18* (2013.01); *F01N 2610/1406* (2013.01); *F28D 2021/008* (2013.01); *Y02E 60/142* (2013.01); *Y02T 10/26* (2013.01)

(56) References Cited

U.S. PATENT DOCUMENTS

2005/0247050 A1* 11/2005 Kaboord .................. C01C 1/006 60/286
2012/0017569 A1* 1/2012 Gaiser .................. F01N 3/2006 60/274

FOREIGN PATENT DOCUMENTS

| JP | 05125929 A * | 5/1993 |
| JP | 2003-197246 | 7/2003 |
| JP | 2008-41524 | 2/2008 |
| JP | 2009-215103 | 9/2009 |
| JP | 2011-106355 | 6/2011 |
| JP | 2011-208865 | 10/2011 |

* cited by examiner (a)

(b)

(c)

HEAT STORAGE DEVICE

TECHNICAL FIELD

The present invention relates to a heat storage device provided in an exhaust system of an internal-combustion engine of a vehicle.

BACKGROUND ART

As a heat storage device, one disclosed in Patent Literature 1 has been known, for example. The heat storage device disclosed in Patent Literature 1 comprises a reaction vessel for containing a heat storage member which reversibly causes exothermic and endothermic reactions with a reaction medium, a storage vessel for storing the reaction medium, a communication passage for communicating the reaction and storage vessels to each other, so as to enable the reaction medium to circulate between the reaction and storage vessels, and a heater for heating the reaction medium in the storage vessel.

CITATION LIST

Patent Literature

Patent Literature 1: Japanese Patent Application Laid-Open No. 2011-208865

SUMMARY OF INVENTION

Technical Problem

The following problem exists, for example, when ammonia ($NH_3$) is used as a reaction medium while an absorbent physically absorbing ammonia is stored in a storage vessel (ammonia reservoir). Once ammonia is separated from the absorbent of the ammonia reservoir when generating heat from the heat storage member, the temperature of the ammonia reservoir drops. When its temperature drops, the ammonia reservoir is hard to supply ammonia to the heat storage member. This makes it necessary to keep the ammonia reservoir at a desirable temperature. When a heater is used for the temperature control of the ammonia reservoir as in the above-mentioned prior art, power is required for operating the heater, which incurs energy loss.

It is an object of the present invention to provide a heat storage device which can control the temperature of the ammonia reservoir without using extra power.

Solution to Problem

The present invention is a heat storage device for heating a catalyst arranged in an exhaust system of an internal-combustion engine of a vehicle, the heat storage device comprising a reactor, arranged in the exhaust system, having a formed body chemically reacting with ammonia and generating heat; and an ammonia reservoir, connected to the reactor, for storing the ammonia; the ammonia reservoir incorporating therein an absorbent physically absorbing the ammonia; the ammonia reservoir having a heat-exchanging structure and being temperature controlled by heat exchange with an external heating medium.

In the heat storage device of the present invention, ammonia is physically absorbed by the absorbent incorporated in the ammonia reservoir, so as to be stored in the ammonia reservoir. The ammonia reservoir having the heat-exchanging structure is temperature controlled by heat exchange with the external heating medium. When the ammonia reservoir is heated by heat exchange with the external heating medium, ammonia is separated from the absorbent. The separated ammonia is supplied from the ammonia reservoir to the reactor. In the reactor, a chemical reaction between the formed body and ammonia occurs, whereby heat is generated from the formed body. The ammonia reservoir is kept at a desirable temperature by heat exchange with the external heating medium, which promotes the action of separating ammonia from the absorbent. Hence, without using a device requiring power (e.g., heater), the temperature of the ammonia reservoir can be controlled to a desirable temperature by utilizing heat exchange with the external heating medium.

The ammonia reservoir may be arranged in any of a front part of a body, an engine room, and a rear cargo room in the vehicle. The reactor is arranged in the exhaust system located in the lower part of the body. Since ammonia which is a gas is used as a medium chemically reacting with the formed body, the ammonia reservoir can be arranged at locations far apart from the reactor, such as the front part of the body, the engine room, and the rear cargo room.

The ammonia reservoir may be arranged adjacent to and on the downstream side of a fan arranged in the engine room. This makes it possible to control the temperature of the ammonia reservoir by heat exchange with air sent from the fan arranged in the engine room. The ammonia reservoir is arranged at a position where an airflow occurs even when the vehicle is not running. This makes it unnecessary to newly provide a device for the temperature control of the ammonia reservoir.

The ammonia reservoir may be arranged adjacent to an outlet portion for compressed air used for an air brake device of the vehicle. This makes it possible to control the temperature of the ammonia reservoir by heat exchange with the compressed air. Since the compressed air used for the air brake device is utilized, it is not necessary to separately add a device for generating the compressed air. This can simplify the structure of the heat storage device. The ammonia reservoir is arranged at a position where an airflow occurs even when the vehicle is not running. This makes it unnecessary to newly provide a device for the temperature control of the ammonia reservoir.

The ammonia reservoir may be arranged in the engine room or rear cargo room, so as to being temperature controlled by heat exchange with a coolant serving as the external heating medium. This makes it possible to control the temperature of the ammonia reservoir by heat exchange with the coolant passing through the engine room or rear cargo room.

The ammonia reservoir may be arranged adjacent to and on the downstream side of a fan arranged in the rear cargo room. The rear cargo room has ample space and thus is advantageous for arranging the ammonia reservoir. Hence, arranging the fan in the rear cargo room and placing the ammonia reservoir on the downstream side of the fan makes it possible to control the temperature of the ammonia reservoir by heat exchange with air sent from the fan.

Advantageous Effects of Invention

The present invention can provide a heat storage device which can control the temperature of the ammonia reservoir without using extra power.

DESCRIPTION OF EMBODIMENTS

In the following, preferred embodiments of the present invention will be described in detail with reference to the drawings. In the description, identical elements or elements with identical functionality will be denoted by the same reference symbols, without redundant description.

Figure 1:
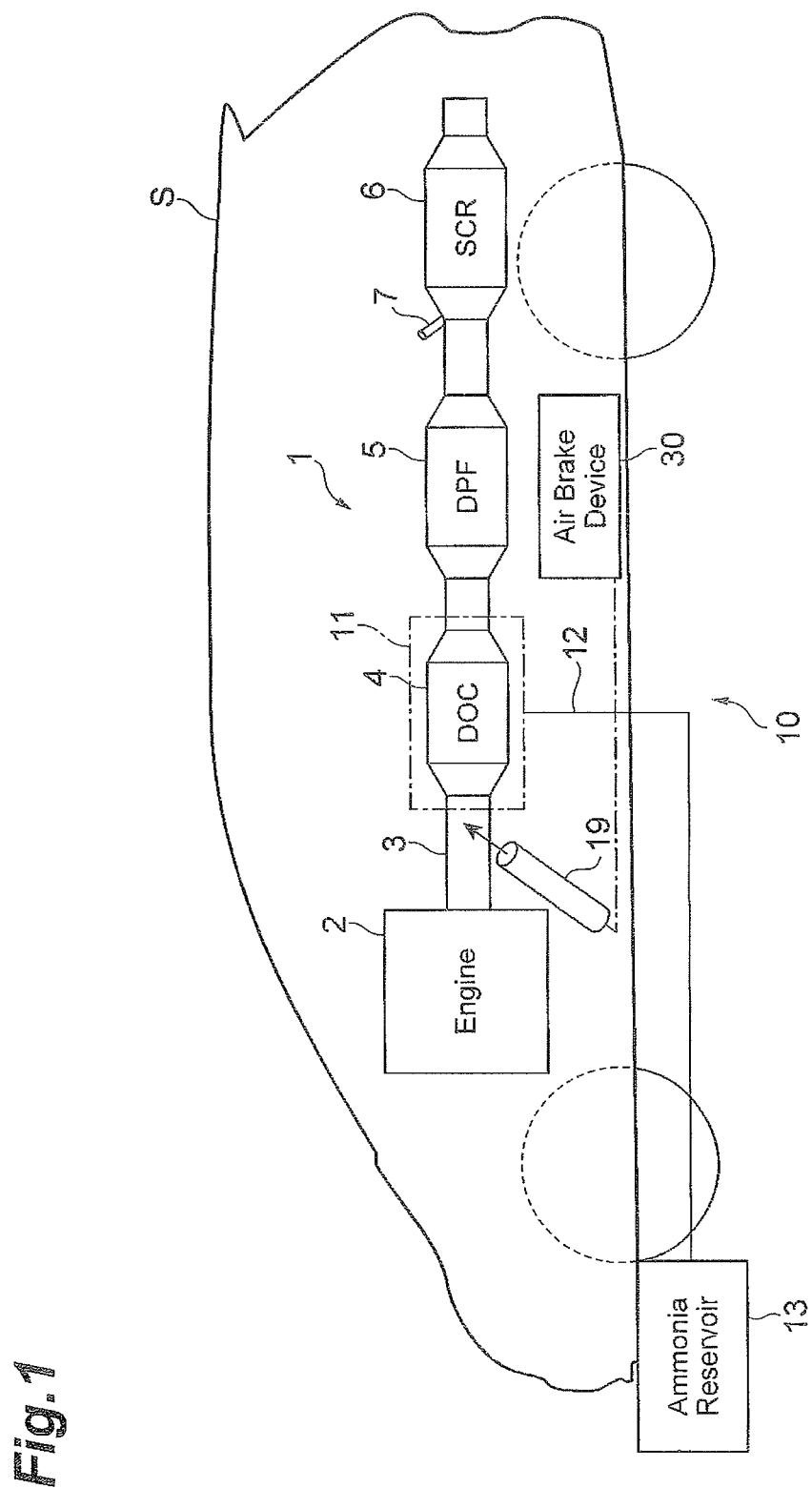
FIG. 1 is a schematic structural diagram illustrating an exhaust purification system equipped with the heat storage device in accordance with an embodiment of the present invention.
Figure 2:
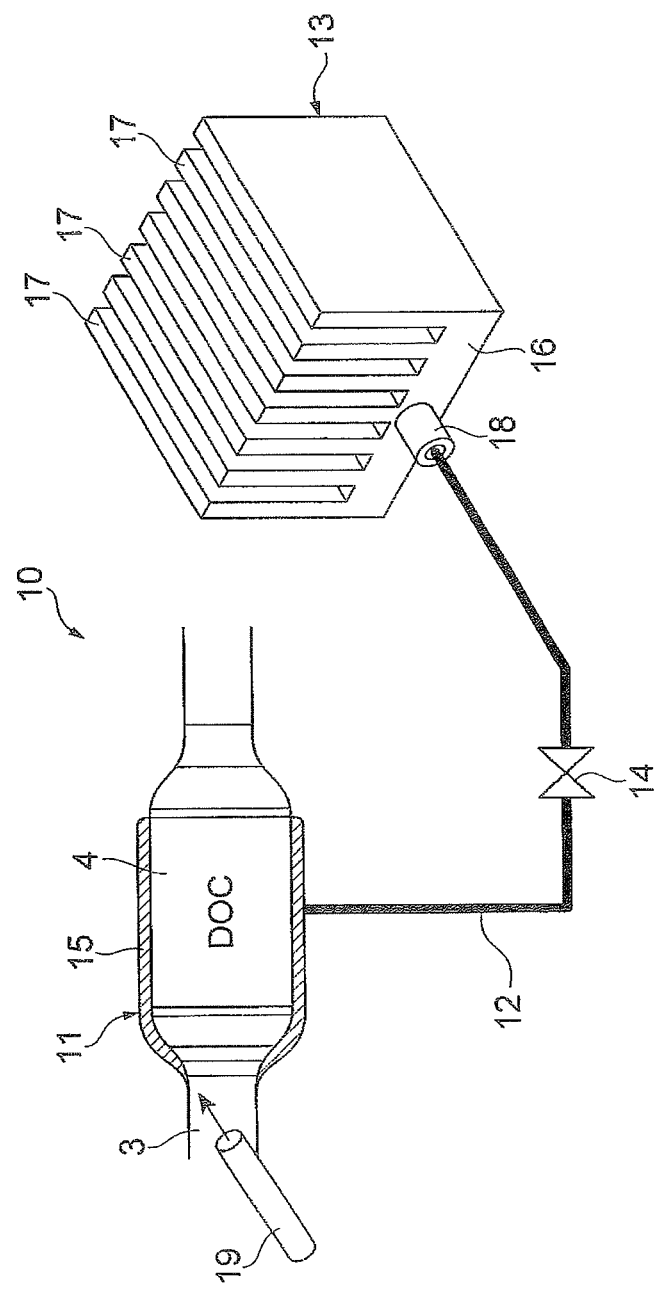
FIG. 2 is a structural diagram illustrating the heat storage device in accordance with the embodiment.

FIG. 1 is a schematic structural diagram illustrating an exhaust purification system equipped with the heat storage device in accordance with an embodiment. FIG. 2 is a structural diagram illustrating the heat storage device in accordance with the embodiment. In each diagram, an exhaust purification system 1 is arranged in an exhaust system of an engine 2 (diesel engine here) of a vehicle S. The exhaust purification system 1 purifies harmful substances (environmental pollutants) contained in an exhaust gas discharged from the engine 2.

From the upstream side to downstream side of an exhaust passage 3 connected to the engine 2, the exhaust purification system 1 has a diesel oxidation catalyst (DOC) 4, a diesel particulate filter (DPF) 5, and a selective reduction catalyst (SCR) 6. The DOC 4 oxidizes HC, CO, and the like contained in the exhaust gas. The DPF 5 collects and removes PM contained in the exhaust gas. The SCR 6 supplies urea and ammonia from an adding valve 7, so as to reduce and purify NOx contained in the exhaust gas.

There are temperatures optimal for the DOC 4 and SCR 6 to activate their abilities to purify the environmental pollutants. For example, the optimal temperatures for the DOC 4 and SCR 6 are about 150° C. and about 180° C., respectively. This makes it necessary for the DOC 4 and SCR 6 to be heated in order for them to attain their optimal temperatures or higher.

The exhaust purification system 1 has a heat storage device 10 of this embodiment. The heat storage device 10 is a chemical heat storage device for heating a catalyst. The heat storage device 10 normally stores heat of the exhaust gas (exhaust heat) and uses the heat when necessary.

The heat storage device 10 comprises a reactor 11 and an ammonia reservoir 13. The reactor 11 is arranged at an outer peripheral portion of the DOC 4. The ammonia reservoir 13 is connected to the reactor 11 through a conduit 12 and stores ammonia ($NH_3$). An opening and closing valve 14 is arranged in the conduit 12.

The reactor 11 has a formed body 15. The formed body 15 contains a solid or powdery reaction material chemically reacting with ammonia. Example of the reaction material include $CaCl_2$, $MgCl_2$, $NiCl_2$, $ZnCl_2$, $SrCl_2$ or the like.

The ammonia reservoir 13 is arranged in a front part of the body of the vehicle S (see FIG. 1). Ammonia is used as a medium which chemically reacts with the reaction material contained in the formed body 15. This makes it possible to set the conduit 12 longer, thereby increasing the degree of freedom in setting where to arrange the ammonia reservoir 13. Preferably, the ammonia reservoir 13 is arranged in the underbody. The underbody has ample space for arranging the ammonia reservoir 13. The ammonia reservoir 13 arranged in the underbody is likely to receive a running wind.

The ammonia reservoir 13 incorporates therein activated carbon as an absorbent physically absorbing ammonia. Therefore, the ammonia reservoir 13 stores ammonia in a state physically absorbed by activated carbon.

Figure 3:
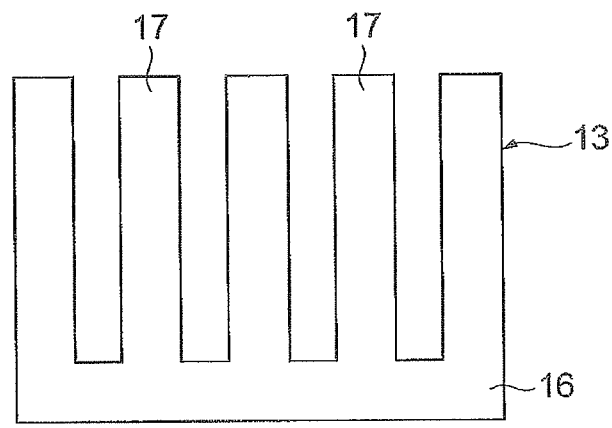
FIG. 3 is a diagram illustrating a front view of an ammonia reservoir depicted in FIG. 2 and its modified examples.
Figure 3:
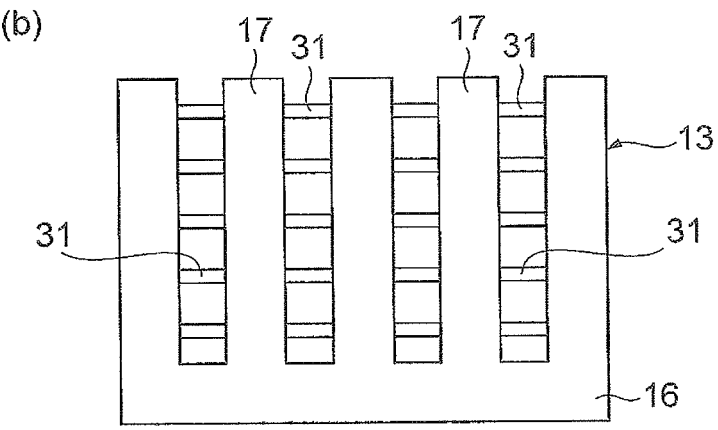
Figure 3:
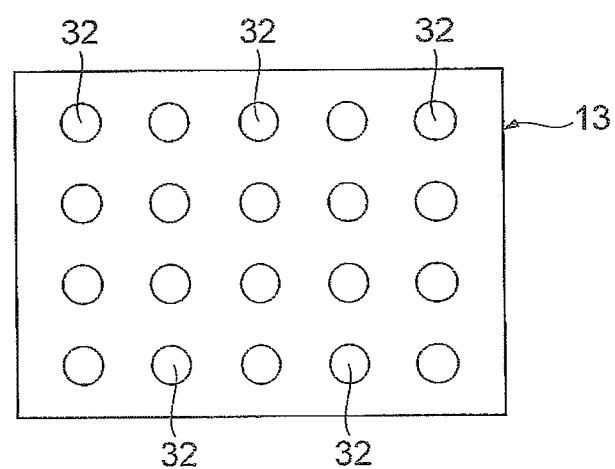

As illustrated in FIGS. 2 and 3(a), the ammonia reservoir 13 has a rectangular base portion 16 and a plurality of plate fins (heat-exchanging fins) 17 integrated with the base portion 16. The ammonia reservoir 13 has a heat-exchanging structure in the form of a comb-shaped heatsink in order to increase its surface area. An ammonia port portion 18 connected to the conduit 12 is arranged in the base portion 16. The ammonia reservoir 13 is arranged in the front part of the body of the vehicle S such that the leading end of each plate fin 17 faces down.

The heat-exchanging structure of the ammonia reservoir 13 is not limited to the one mentioned above in particular. For example, as illustrated in FIG. 3(b), a plurality of small fins 31 may be arranged on a side face of each plate fin 17 in order to further increase the surface area of the ammonia reservoir 13. As illustrated in FIG. 3(c), the ammonia reservoir 13 may be shaped into a rectangular parallelepiped and formed with a plurality of through holes 32. This can also increase the surface area of the ammonia reservoir 13.

When ammonia is to be physically absorbed by activated carbon, it is preferred for the ammonia reservoir 13 to be kept at a desirable temperature before and after starting the absorption. When separating ammonia from activated carbon, it is preferred for the ammonia reservoir 13 to be kept at a desirable temperature before and after starting the separation. The fact that the ammonia reservoir 13 has a heat-exchanging structure with a large surface area makes it possible to control the temperature of the ammonia reservoir 13 by utilizing the running wind occurring when the vehicle is running. Specifically, each plate fin 17 exchanges heat with air (external heating medium) introduced by the running wind, whereby the ammonia reservoir 13 can be kept at a desirable temperature.

Arranged on the upstream side of the DOC 4 in the exhaust passage 3 is a compressed air supply portion 19 for ejecting compressed air used in an air brake device 30 to the upstream side of the DOC 4 in the exhaust passage 3. The air brake device 30 is equipped with a compressor (not depicted) for supplying the compressed air. The compressed air supplied from the compressor is used as a braking force source in the air brake device 30. That is, the compressed air supplied from the compressor is guided to the compressed air supply portion 19 through a conduit or the like.

When the temperature of the exhaust gas from the engine 2 is too high, there is a fear of the formed body 15 incorporated in the reactor 11 melting or of ammonia aimed to react with the reaction material (e.g., $CaCl_2$) contained in the formed body 15 decomposing. The melting temperature of the formed body 15 containing the reaction material is about 700° C., while the decomposition temperature of ammonia is about 400° C.

It is therefore preferred for the exhaust gas to be cooled by the compressed air so as to have a temperature lower than 400° C. When the temperature of the exhaust gas is lower than 400° C., the temperature of the reactor 11 is lower than the decomposition temperature of ammonia. This prevents the formed body 15 from melting and ammonia from decomposing.

Specifically, the compressed air is guided to the compressed air supply portion 19 through a conduit connected to a compressor or reservoir (none depicted) with which the air brake device 30 is equipped or the like. A control valve (not depicted) is arranged in this conduit. The control valve is controlled so as to open when cooling the exhaust gas from the engine 2, whereby the compressed air is guided to the compressed air supply portion 19. As a consequence, a desirable amount of the compressed air can be guided to the compressed air supply portion 19 when the exhaust gas is required to be cooled. The opening of the control valve may be controlled so as to regulate the amount of compressed air guided to the compressed air supply portion 19. As the compressed air guided from the air brake device 30, the compressed air discharged from the air brake device 30 when releasing the brake may be guided to the compressed air supply portion 19. This case employs the compressed air that is typically discharged, whereby energy can effectively be utilized.

In the exhaust purification system 1 equipped with the heat storage device 10, when the temperature of the exhaust gas from the engine 2 is lower than a predetermined value while the vehicle S is running, ammonia stored in the ammonia reservoir 13 is supplied to the reactor 11 through the conduit 12. The reaction material (e.g., $CaCl_2$) contained in the formed body 15 of the reactor 11 and ammonia ($NH_3$) chemically react with each other, so that the former chemically absorbs the latter (through a coordinate bond), whereby the formed body 15 generates heat. That is, a reaction from the left side to right side in the following reaction formula occurs. The heat generated from the formed body 15 raises the temperatures of the DOC 4 and SCR 6 until they are suitable for purifying the pollutants.

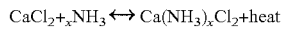

$$CaCl_2 + xNH_3 \leftrightarrow Ca(NH_3)_xCl_2 + heat$$

As ammonia is separated from activated carbon in the ammonia reservoir 13, the temperature of the ammonia reservoir 13 decreases. In this embodiment, the heat exchange between the ammonia reservoir 13 and the running wind restrains the temperature of the ammonia reservoir 13 from decreasing. This enables the ammonia reservoir 13 to supply ammonia smoothly to the reactor 11, thereby preventing the formed body 15 from taking time to generate heat.

When the temperature of the exhaust gas from the engine 2 is higher than a predetermined value, the exhaust heat is imparted to the formed body 15 of the reactor 11, whereby $CaCl_2$ and ammonia ($NH_3$) are separated from each other. That is, a reaction from the right side to left side in the above-mentioned reaction formula occurs. Thus separated ammonia returns from the reactor 11 into the ammonia reservoir 13 through the conduit 12. The ammonia returned into the ammonia reservoir 13 is physically absorbed by activated carbon incorporated in the ammonia reservoir 13.

In this embodiment, as in the foregoing, the ammonia reservoir 13 having a heat-exchanging structure is arranged in the front part of the body of the vehicle S, whereby the ammonia reservoir 13 is temperature controlled so as to become at least a desirable temperature or fall within a desirable temperature range by the air introduced by the running wind occurring when the vehicle S is running. Since the temperature of the ammonia reservoir 13 is thus controlled, no heater is necessary for heating the ammonia reservoir 13, and no power is required for operating the heater. This can inhibit energy loss from occurring due to the power for operating the heater.

Since the air introduced by the running wind of the vehicle S is utilized, no mechanism is required for generating air for the temperature control of the ammonia reservoir 13. Therefore, the ammonia reservoir 13 can be temperature controlled by a simple structure. When a liquid such as water is used as a medium for a chemical reaction, a reservoir and a reactor cannot be arranged far apart from each other. In Japanese Patent Application Laid-Open No. 2011-106355, for example, the reservoir and reactor are integrated with each other. When utilizing the running wind for the temperature control of the reservoir in this case, sufficient running wind does not always act on plate fins of the reservoir depending on exhaust passages under the vehicle floor and the layout of the surroundings of the reactor. Since this embodiment uses ammonia in the form of a gas as a medium for a chemical reaction, the ammonia reservoir 13 and reactor 11 can be arranged with a distance of 1 m or more therebetween. Hence, regardless of where the reactor 11 is arranged, the plate fins 17 of the ammonia reservoir 13 can be arranged at positions where sufficient running wind acts, so as to control the temperature of the ammonia reservoir 13.

Figure 4:
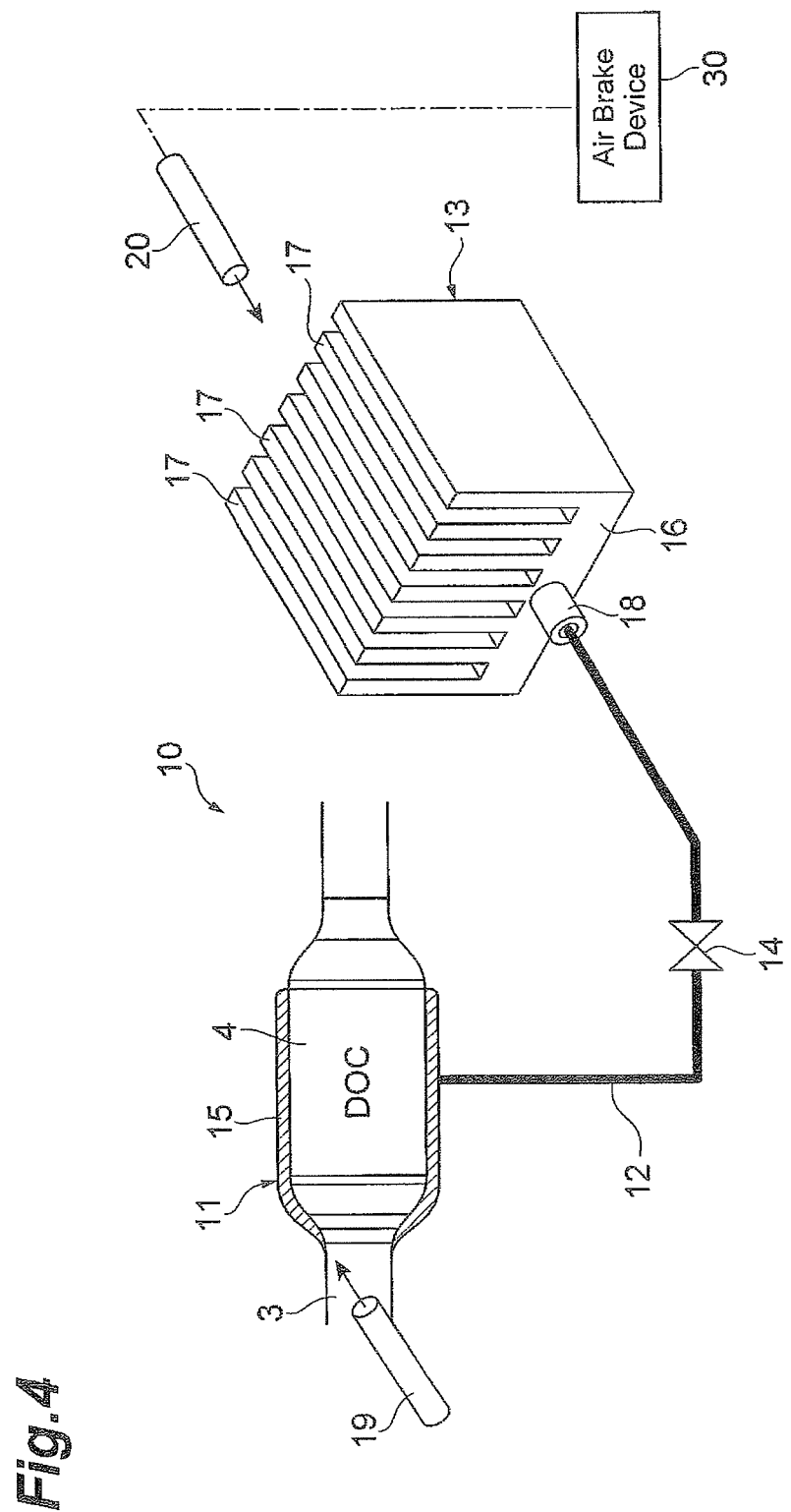
FIG. 4 is a structural diagram illustrating the heat storage device in accordance with a modified example of the embodiment.

FIG. 4 is a structural diagram illustrating the heat storage device in accordance with a modified example of the embodiment. As illustrated in FIG. 4, the heat storage device 10 of this embodiment further comprises a compressed air outlet portion 20. The compressed air outlet portion 20 ejects compressed air (external heating medium) for the temperature control of the ammonia reservoir 13 to the ammonia reservoir 13. The ammonia reservoir 13 is arranged adjacent to the compressed air outlet portion 20. As with the above-mentioned compressed air supply portion 19, the compressed air outlet portion 20 ejects the compressed air used for the air brake device 30. The compressed air is guided from the air brake device 30 to the compressed air outlet portion 20 through a conduit or the like. This makes it unnecessary to separately add a device for generating the compressed air.

The compressed air aggressively blows on the ammonia reservoir 13, thereby exchanging heat with the ammonia reservoir 13. This makes it possible to keep the ammonia reservoir 13 at a desirable temperature or higher.

The compressed air is ejected from the compressed air outlet portion 20 to the ammonia reservoir 13. Therefore, as in the above-mentioned embodiment, the temperature of the ammonia reservoir 13 can be controlled without using power for operating a heater.

Specifically, the compressed air is guided to the compressed air outlet portion 20 through a conduit connected to a compressor or reservoir (none depicted) with which the air brake device 30 is equipped or the like. A control valve (not depicted) is arranged in this conduit. The control valve is controlled so as to open when controlling the temperature of the ammonia reservoir 13, whereby the compressed air is guided to the compressed air outlet portion 20. As a consequence, a desirable amount of the compressed air can be guided to the compressed air outlet portion 20 when the ammonia reservoir 13 is required to be temperature controlled. The opening of the control valve may be controlled so as to regulate the amount of compressed air guided to the compressed air outlet portion 20. As the compressed air guided from the air brake device 30, the compressed air discharged from the air brake device 30 when releasing the brake may be guided to the compressed air outlet portion 20. This case employs the compressed air that is typically discharged, whereby energy can effectively be utilized.

The ammonia reservoir 13 can be arranged where the running wind of the vehicle S is hard to act. While the engine of the vehicle S is driven, the ammonia reservoir 13 can be temperature controlled even when the vehicle S is stopped and thus generates no running wind. Since the ammonia reservoir 13 is arranged at a location where an airflow occurs even when the vehicle is not running, there is no need to newly provide a device for the temperature control of the ammonia reservoir 13.

Figure 5:
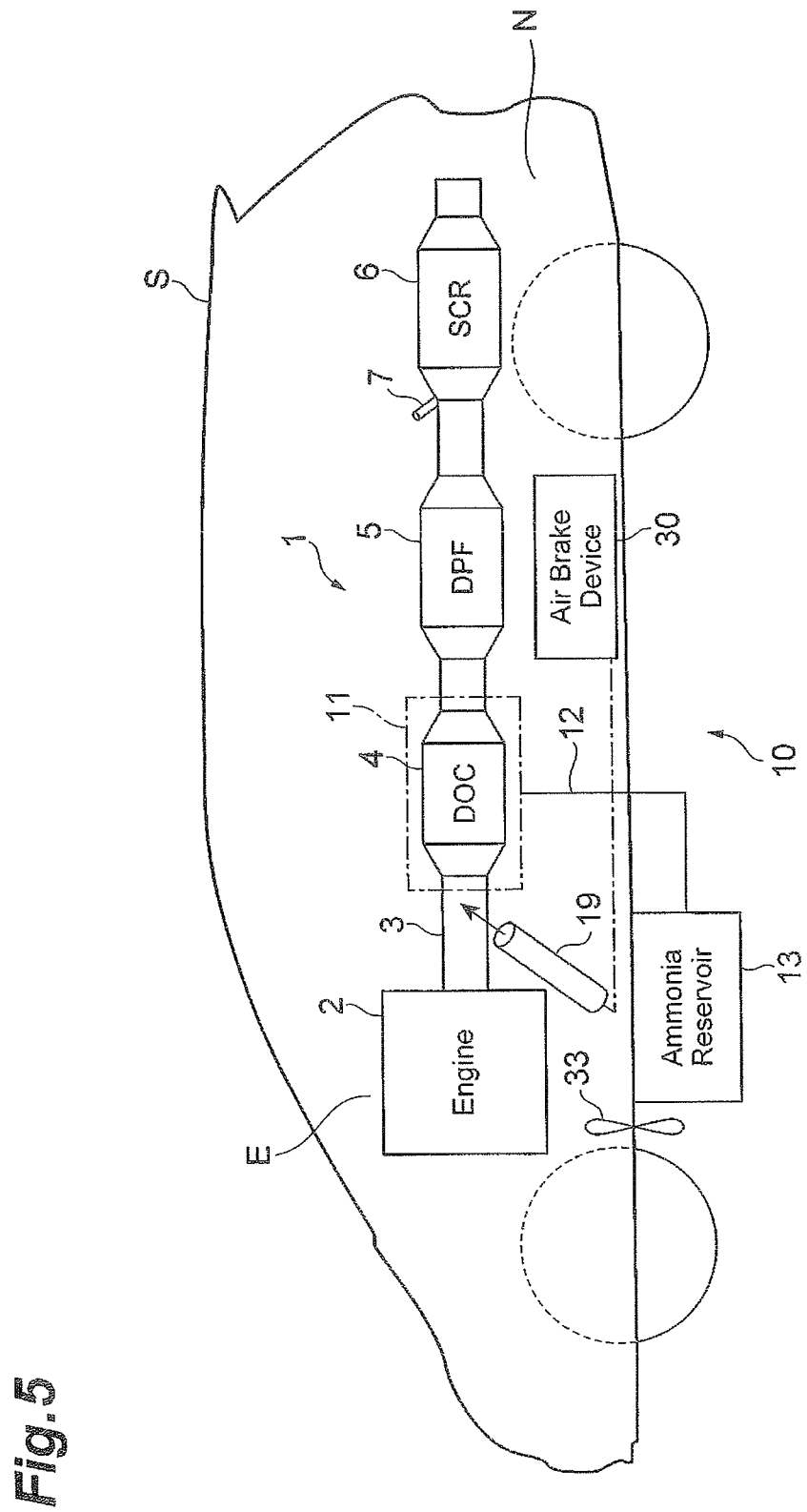
FIG. 5 is a schematic structural diagram illustrating an exhaust purification system equipped with the heat storage device in accordance with another modified example of the embodiment.

FIG. 5 is a schematic structural diagram illustrating an exhaust purification system equipped with the heat storage device in accordance with another modified example of the embodiment. As illustrated in FIG. 5, the ammonia reservoir 13 is arranged in an engine room E of the vehicle S. A fan 33 for sending winds to a radiator is arranged in the engine room E. Employed as the fan 33 is one consuming less power than a heater.

The ammonia reservoir 13 is arranged adjacent to and on the downstream side of the fan 33. In this case, a part of the air (external heating medium) sent from the fan 33 to the radiator exchanges heat with the ammonia reservoir 13, whereby the ammonia reservoir 13 can be kept at a desirable temperature or higher. Since the ammonia reservoir 13 is arranged at a location where an airflow occurs even when the vehicle is not running, there is no need to newly provide a device for the temperature control of the ammonia reservoir 13.

The ammonia reservoir 13 may be arranged near a flow path through which a coolant flows in the engine room E. In this case, the coolant exchanges heat with the ammonia reservoir 13, whereby the ammonia reservoir 13 can be kept at a desirable temperature or higher.

A rear cargo room N of the vehicle S has ample space. Therefore, a fan may be arranged separately in the rear cargo room N, and the ammonia reservoir 13 may be arranged on the downstream side of this fan. A coolant (external heating medium) may be caused to flow through the inside of the rear cargo room N, and the ammonia reservoir 13 may be arranged near a flow path through which the coolant flows.

While some preferred embodiments of the heat storage device in accordance with the present invention are explained in the foregoing, the present invention is not limited to the above-mentioned embodiments. For example, the reactor 11 in the heat storage device 10 is not limited to the one provided at the outer peripheral portion of the DOC 4 as in the above-mentioned embodiments. A reactor having a formed body chemically reacting with ammonia may be arranged on the upstream side of the DOC 4 in the exhaust passage 3.

INDUSTRIAL APPLICABILITY

The present invention can be utilized in a heat storage device which warms up a catalyst arranged in an exhaust system of an internal-combustion engine (e.g., diesel engine).

REFERENCE SIGNS LIST

2: engine (internal-combustion engine); 3: exhaust passage (exhaust system); 4: diesel oxidation catalyst (DOC); 6: selective reduction catalyst (SCR); 10: heat storage device; 11: reactor; 13: ammonia reservoir; 15: formed body; 17: plate fin (heat-exchanging fin); 20: compressed air outlet portion; S: vehicle; E: engine room; N: rear cargo room.

The invention claimed is:

1. A heat storage device for heating a catalyst arranged in an exhaust system of an internal-combustion engine of a vehicle, the heat storage device comprising:
   a reactor, arranged in the exhaust system, having a formed body chemically reacting with ammonia and generating heat; and
   an ammonia reservoir, connected to the reactor, for storing the ammonia;
   wherein the ammonia reservoir incorporates therein an absorbent physically absorbing the ammonia; and
   wherein the ammonia reservoir has a heat-exchanging structure and is temperature controlled by heat exchange with an air.

2. The heat storage device according to claim 1, wherein the ammonia reservoir is arranged in one of a front part of a body, an engine room, and a rear cargo room in the vehicle.

3. The heat storage device according to claim 2, wherein the ammonia reservoir is arranged adjacent to and on the downstream side of a fan arranged in the engine room.

4. The heat storage device according to claim 1, wherein the ammonia reservoir is arranged adjacent to an outlet portion for compressed air used for an air brake device of the vehicle.

5. The heat storage device according to claim 2, wherein the ammonia reservoir is arranged adjacent to and on the downstream side of a fan arranged in the rear cargo room.

* * * * *